(12) United States Patent
Warner et al.

(10) Patent No.: US 7,028,703 B1
(45) Date of Patent: Apr. 18, 2006

(54) BURIED FLUID LINE CASING ENCLOSED VALVE GUARD

(75) Inventors: Joseph K. Warner, York Springs, PA (US); Christopher D. Thorpe, Carlisle, PA (US)

(73) Assignee: Joseph K. Warner Excavating, York Springs, PA (US)

( * ) Notice: Subject to any disclaimer, the term of this patent is extended or adjusted under 35 U.S.C. 154(b) by 0 days.

(21) Appl. No.: 11/136,906

(22) Filed: May 25, 2005

(51) Int. Cl.
*F16L 5/00* (2006.01)
*F15L 58/00* (2006.01)

(52) U.S. Cl. .................. 137/365; 137/364; 137/367
(58) Field of Classification Search ............ 137/364, 137/367, 369, 365, 370, 371
See application file for complete search history.

(56) References Cited

U.S. PATENT DOCUMENTS

| 44,904 | A | * | 11/1864 | Weldon | 137/371 |
|---|---|---|---|---|---|
| 604,622 | A | * | 5/1898 | Lobdell et al. | 137/365 |
| 4,030,519 | A | * | 6/1977 | Zinn | 137/364 |
| 4,691,733 | A | * | 9/1987 | Zinn | 137/364 |
| 5,634,488 | A | * | 6/1997 | Martin, Jr. | 137/370 |
| 6,354,325 | B1 | * | 3/2002 | Warnes et al. | 137/367 |

* cited by examiner

Primary Examiner—A. Michael Chambers
(74) Attorney, Agent, or Firm—Peter Gibson

(57) ABSTRACT

A guard for a valve upon a buried fluid line prevents earth entering the opposed arches or the bottom of a conventional casing during installation about and above the valve permitting access after filling of the excavated cavity for the fluid line. Alignment of the casing with the valve and the fluid line is also facilitated with an upward facing bore of an upward extending upward portion of the guard which permits insertion of the end of a length of conduit during installation and allows passage of the end of a wrench in operation of the buried valve. A longitudinal cavity open at the bottom and ends and continuous with the bore is defined by a lower portion of the guard. Opposed ends extend into the opposed arches of the casing, protect the fluid line from a descendant arch, and serve as guides for casing disposition. Two lateral pairs of stabilizers extending outwardly from either end stabilize the guard with respect to the casing and the fluid line.

20 Claims, 2 Drawing Sheets

FIGURE 1
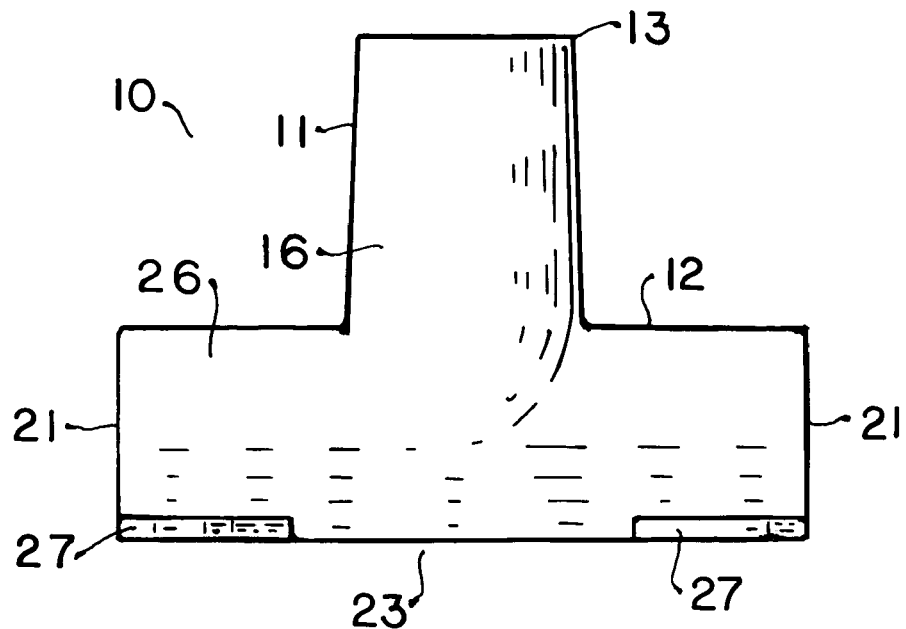
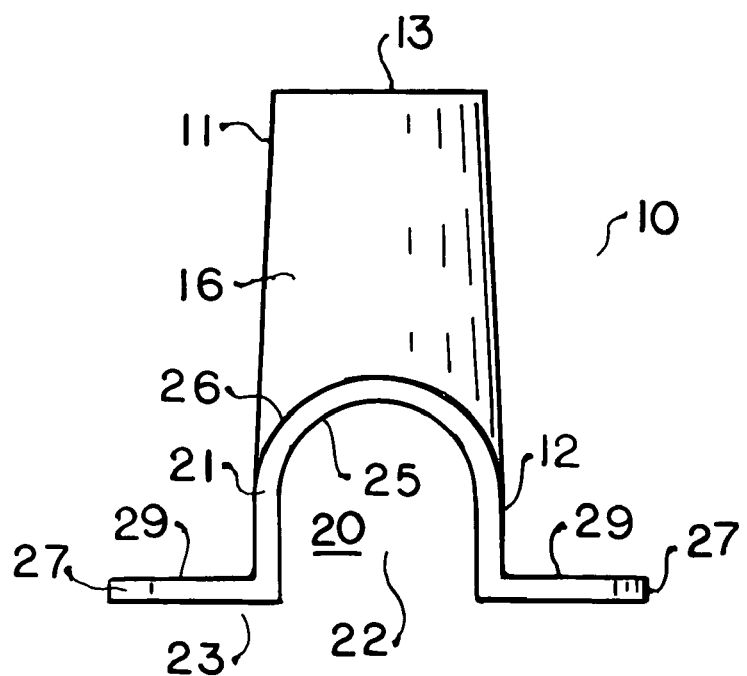
FIGURE 2

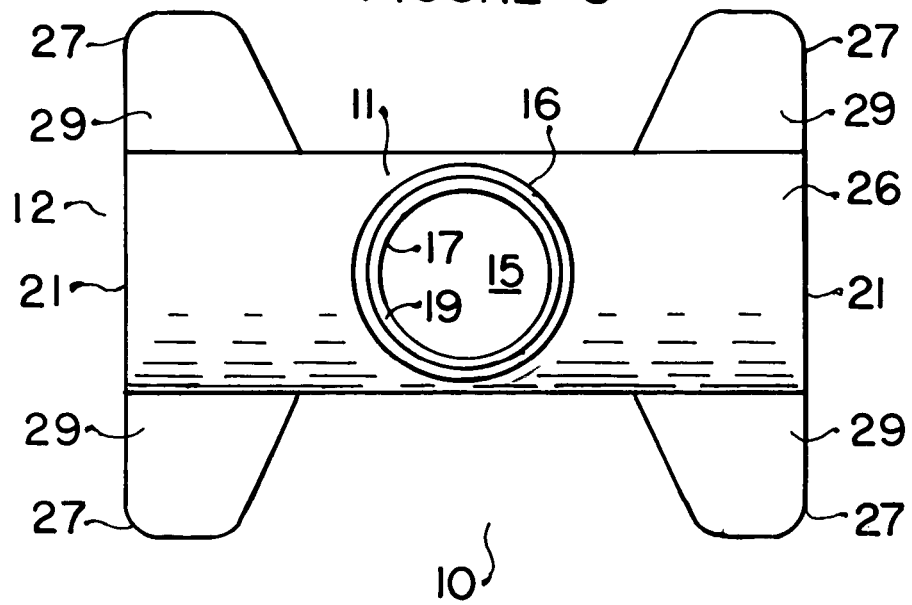
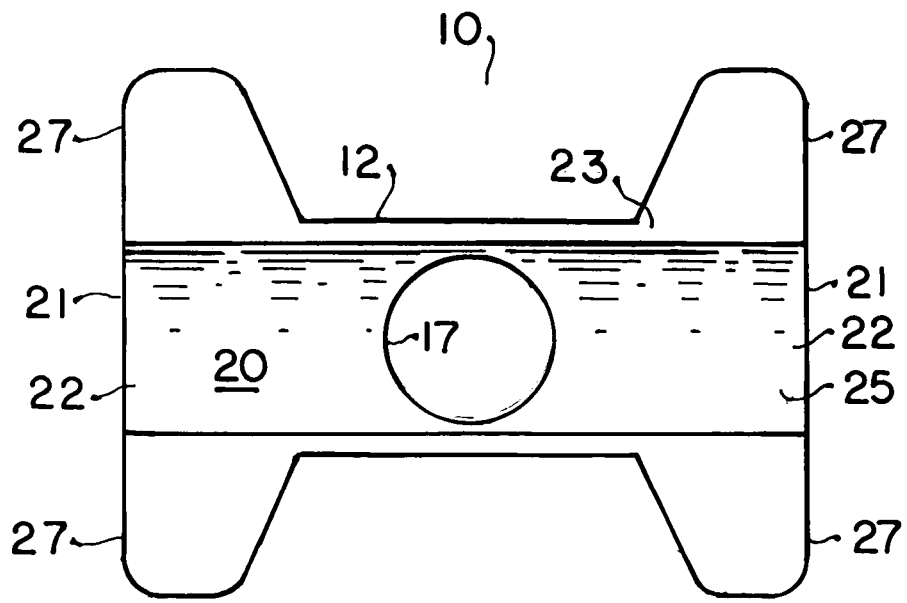

BURIED FLUID LINE CASING ENCLOSED VALVE GUARD

BACKGROUND OF THE INVENTION

1. Field of the Invention

The present invention relates generally to fluid handling valve guards, i.e. Class 137, subclass 382, and particularly to guards for valves located underground.

2. General Background

Water lines are located at a depth underground sufficient to prevent freezing: i.e. below the frost line. Gas lines are located underground to prevent rupture of the same. Any valve located on a fluid line underground requires access means. This is typically provided by what is simply and commonly known as a box. These boxes generally extend upward above the valve concerned to ground level and have a removable cover.

Buildings generally have a shut off valve located in what is commonly known as a curb side box, or curb box, as the same is generally located in proximity to the curb of the street on which the residential building is located. Water mains are generally located under the street and a separate line for each residential structure of a street extend perpendicularly to the water main to each residential structure. A shut off valve is located on each separate line within a curb box. Shut off valves located in curb boxes are exemplary of the structure used for valves located underground on earth buried fluid lines. Main lines are also underground but are typically either buried alongside or under a street or through a tunnel under a street where the valves are accessible by man holes. Intermediate lines connecting main lines with the separate lines for residential structures typically have valves within cases that are similar to curb boxes. Shut off valves in curb boxes are essentially the best example because these are the most plentiful underground valves within casings and the problems commonly associated with installation of curb boxes or other casings for underground valves comprise the problems addressed herein.

When a buried fluid line is installed a trench is dug, typically with a backhoe, and then filled again, again typically with a backhoe. Excavation and filling of the cavity above a valve on an underground fluid line is also typically performed with a backhoe with the curb box or other case first disposed about and above the valve. Curb boxes typically have a pair of opposed arches at the bottom for passage of the line there through without physical contact between the curb box and the line which could easily result in rupture of the line. When the cavity is filled two problems are commonly created for the valve concerned. Earth often enters the box through the arches and covers the valve. The top of the valve must be clear to permit engagement with the end, typically a socket, of a tool of sufficient length to reach the valve through the curb box from someone above ground. Secondly, the valve must be properly aligned with the curb box, i.e. pointing straight up, to easily permit engagement of the socket on the end of the tool used to operate the shut off valve.

As backhoes are typically used to fill the cavity it is also exceeding easy to knock the curb box away from the vertical orientation it must have to permit operable access to the shut off valve. This is the most common action causing both earth to enter through the arches at the bottom of the curb box in a quantity sufficient to cover the valve and to alter the alignment of the curb box with the valve. The most typical address of the first problem is to stuff rags in the arches about the fluid line. This is not considered to be very effective. After a curb box is disturbed aligning the same again with the valve is also difficult and removing any dirt on the valve is most difficult. Excavating the cavity and doing the job over again is, for practical purposes, the only effective address of these problems. Doing the job right the first time is, as usual, the idea. But work of this kind is not typically done by labor performed for pay on an hourly basis and there is hence little incentive to do it over if improperly performed the first time.

More pertinently, perhaps, if the work was done on an hourly basis there would be incentive to create problems that would require additional time to rectify. Most pertinently, however, it is noted that any problems with being able to easily access the shut valve in a curb box are literally buried when installation is completed and will not 'come to light' until the water or other fluid through the line is to be shut off. This work, moreover, is not done by the same people who installed the buried line and the valve in the curb box or other casing. Therefore there is little incentive indeed for ensuring that the job is done correctly in the first place. And if the valve is not operable when the time comes because access to the same through the curb box or other casing is not feasible because the valve is covered with dirt or the casing is misaligned the only solution is excavation. Only this time it wasn't expected and a backhoe must be brought in or the excavation manually performed. This is, in a word, expensive.

Discussion of the Prior Art

U.S. Pat. No. 44,904 for a 'Water Plug Case', issued Nov. 1, 1864 to J. G. Weldon provides an illustration of a curb box for a valve on a buried fluid line and further attests to the age of such structures which are still typically cast iron.

U.S. Pat. No. 173,972 issued Feb. 22, 1876 to J. Lancaster for a 'Stop-Cock Boxing' discloses a curb box with opposed arches and telescoping structure for accommodation of various depths. A cup at the top of the boxing is also disclosed "to receive whatever contents may enter same" and prevent "accumulation (that would) make it difficult to control the stop-cock".

U.S. Pat. No. 4,030,519 issued Jun. 21, 1977 to Frank R. Zinn discloses a "valve cover for covering a buried valve and permitting access thereto with a two piece, rigid plastic housing having a square cross section which resists rotation in the ground." At the lower end opposed openings are provided "in the housing walls through which the pipes extend from the valve" having "a plurality of fingers . . . to form a tapering passage which will accommodate different sizes of pipes". (Abstract).

U.S. Pat. No. 4,691,733 issued Sep. 8, 1987 to Frank R. Zinn discloses a: "valve cover assembly and support member having opposed slots extending downwardly from the upper end thereof and extending into the lower end of a conventional valve cover to lock the valve against rotation and hold the valve in an upright position." (Abstract) This cover is essentially inverted with respect to the arches of a conventional curb box as clearly depicted therein.

U.S. Pat. No. 6,354,325 issued Mar. 12, 2002 to Warnes et al. discloses an 'Underground Access Conduit' "for enclosing an underground area surrounding the actuating mechanism of a flow control valve" having a cup shaped body open at bottom and top with a horizontal plate fitted to the bottom opening with a plurality of resilient fingers upwardly deformed in contact with the valve for seating upon the same. The upper opening of the body is dimensioned to receive the lower end of a length of conventional polyvinylchloride (PVC) conduit in replacement of a curb box.

While the 'Underground Access Conduit' of Warnes et al. theoretically prevents the covering of an underground fluid line valve with earth when filling the cavity excavated for installation of this portion of the line and further eliminates any problems with alignment of the valve with a casing extending upwardly from about the valve by replacing the casing with a length of conduit engaging a housing seated upon the top of the valve, as a practical matter the structure is problematic because the exterior of the valve body concerned, as clearly shown therein, is tapered and the resilience of the fingers act to push the same upward. The assembly must hence be held downward with the top end of the conduit when filling the excavated cavity. This not only requires someone for holding the assembly down while someone else fills the cavity but effectively prevents use of a backhoe for the job as the same could easily inflict severe damage to the person holding the conduit. These drawbacks effectively render the approach suitable to amateurs only but state regulations require this work be done by a state licensed contractor. Apart from these failings it is further considered that only the dirt above the body is holding the same in place upon the valve as the PVC conduit is lightweight and hence further extremely susceptible to accidental displacement by a landscaper or anyone operating a machine in proximity to the top of the conduit including a riding lawnmower if the top of the conduit is or becomes exposed.

The valve covers disclosed by Zinn are intended to accommodate differing pipe diameters and to prevent rotation of a buried valve. No provision is made to prevent the covering of the valve with dirt or angular misalignment of the valve with the casing if tipped or otherwise disturbed by a backhoe during filling of the excavated cavity. Similarly, the 'stop-cock boxing' disclosed by Lancaster is intended to prevent debris or earth from entering the box or case but if the same is disturbed during filling of the excavated cavity there is nothing to stop earth from entering the arches at the bottom and covering the valve and there is no provision for ensuring that the valve is maintained in an upright disposition.

Statement of Need

Refilling an excavated cavity for an underground fluid line including a valve upon the same is commonly performed with a backhoe, i.e. a powered machine. A casing, or curb box in the case of a typical water shut off valve on a water line to a residential structure, is typically used to preserve access to the valve so the same can be operated at a later time without re-excavating a cavity. During filling of the cavity this casing, typically a curb box, is often disturbed by the backhoe causing two problems: entrance of earth from the bottom of the casing sufficient to cover the valve and misalignment of the valve with the casing or casing with the valve. Either condition easily prevents operation of the valve through the casing with the long handle wrench used for this and necessitates re-excavation. The known prior art fails to effectively address these problems and hence a need is considered to exist for a means of ensuring that operable access to an underground fluid valve through a casing is maintained even if the casing is disturbed while filling the cavity excavated for installation of the buried line and valve thereto.

SUMMARY OF THE INVENTION

Objects of the Invention

The encompassing object of the present invention is to ensure that an underground valve upon a buried fluid line having a casing extending upward from about the valve remains operably accessible through the casing even if the casing is tilted during filling of the cavity excavated for installation of the buried line, the valve, and the casing.

A first auxiliary object of the present invention is to ensure that an underground valve upon a buried fluid line having a casing extending upward from about the valve does not become covered with earth entering either the arches or the bottom of the casing during filling of the cavity excavated for installation of the buried line, the valve, and the casing.

A second auxiliary object of the present invention is to ensure that an underground valve upon a buried fluid line having a casing extending upward from about the valve can be realigned with the casing if the latter is tilted during filling of the cavity excavated for installation of the buried line, the valve, and the casing.

Ancillary objects of the present invention include safety and ease in installation and economic manufacture of a device enabling assurance that an underground valve upon a buried fluid line having a casing extending upward from about the valve remains operably accessible through the casing even if the casing is tilted, or earth enters through the arches of the casing, during filling of the cavity excavated for installation of the buried line, the valve, and the casing.

Principles Relating to the Present Invention

In achievement of the above stated objects it is first suggested that a valve guard be provided that fits about an underground valve on a buried line and further fits inside a conventional casing without physical contact with either the valve or the casing so that if, during filling of the excavated cavity, the casing is disturbed from an upright position any earth entering the bottom of the casing in consequence, or entering through the arches of an upright casing, will not cover the valve. It is secondly suggested that this guard possess means enabling realignment of the casing and the valve if the casing is disturbed during filling of the excavated cavity without having to re-excavate the cavity and without allowing earth to cover the valve.

It is hence suggested that the valve guard possess an inverted 'T' configuration with a generally elongate lower portion substantially enclosing a longitudinal cavity with two opposed open ends allowing passage of the buried fluid line and a generally cylindrical upper portion extending upward from the center of the lower portion having a bore, substantially perpendicular to and in communication with the longitudinal cavity, open at the top for passage of a tool end for operation of the valve. This bore and upward opening is also dimensioned to receive the lower end of a length of conduit for alignment of a casing with the upright valve and further preferably possesses an interior shoulder against which the lower end of the length of conduit inserted into the upper portion can be butted.

During installation the guard is placed about the valve with the lower portion aligned with the fluid line and the upper portion with the valve. The casing is then placed in the excavated cavity and aligned with the guard. A length of conduit of appropriate diameter can be inserted into the bore of the upper portion to facilitate this alignment of the casing. The length of conduit can be removed before the excavated cavity is filled. The valve guard ensures that the valve will not be covered with earth and a length of conduit inserted in the bore provides a visual guide for alignment of the casing with the valve.

The lower portion has an exterior surface that is curved and preferably semi-cylindrical above an area that is flat and vertical to elevate the interior surface above the fluid line. The longitudinal cavity is dimensioned to avoid contact with this fluid line. The longitudinal cavity defined by an interior surface of the lower portion of the guard is preferably open to the bottom. Laterally extended stabilizers are preferably provided in two opposed pairs at each end of the lower portion of the guard which is preferably dimensioned to fit into the opposed arches of a conventional curb box casing such that the bottom of the casing adjacent each side of the arch rests upon the top surfaces of the stabilizers.

Other benefits and advantages may be appreciated with a reading of the detailed discussion of preferred embodiment, especially if made with reference to the drawings attached hereto and briefly described directly below.

BRIEF DESCRIPTION OF THE DRAWINGS

FIG. 1 is a plain elevation view taken from a side of guard for a buried fluid line casing enclosed valve in preferred accordance with the principles relating to the present invention.

FIG. 2 is a plain elevation view taken from an end of the guard of FIG. 1.

FIG. 3 is a plain elevation view taken from the top of the guard of FIG. 1.

FIG. 4 is a plain elevation view taken from the bottom of the guard of FIG. 1.

| NOMENCLATURE | | | |
|---|---|---|---|
| 10 | guard | 20 | longitudinal cavity |
| 11 | upper portion | 21 | end |
| 12 | lower portion | 22 | end opening |
| 13 | top | 23 | bottom |
| 15 | upward opening | 25 | lower interior surface |
| 16 | upper exterior surface | 26 | lower exterior surface |
| 17 | bore | 27 | stabilizers |
| 19 | internal shoulder | 29 | top surfaces |

DETAILED DESCRIPTION OF PREFERRED EMBODIMENT

FIGS. 1–4 depict a guard 10 for a buried fluid line conventional casing enclosed valve, not shown, having an upper portion 11 and a lower portion 12 in one integral piece. This guard 10 is preferably molded in a suitable polymer or resin including thermoplastic or thermoset plastic; according to production volume with resin molding suited to lower volume production and injection molding in thermoplastic suited to higher volume production. But the method of manufacture is relatively unimportant as is the material used. The guard 10 could be sand cast in aluminum, as an alternative example, or made by material deposition in either metal, polymer, or resin. The guard 10 could also be cut or stamped and formed from sheet metal or cut and formed from sheet plastic although this would essentially require joining of separate upper and lower portions 11, 12.

Regardless of the manufacture method the upper and lower portions 11, 12 possess substantially continuous exterior surfaces 16, 26 and one piece construction in the configuration depicted in FIGS. 1–4 is preferred. The upper portion 11 has a top 13 with an upward opening 15 to an internal bore 17 preferably possessing an internal shoulder 19 as seen in FIG. 3. The upper exterior surface 16 also preferably possesses a substantially cylindrical configuration with a slight downward taper outward, as seen in FIGS. 1–3, blending into the lower exterior surface 26 of the lower portion 12. The upward opening 15 to the bore 17 is necessary for passage of the end of a tool for operation of the valve after, and a length of conduit during, installation. The internal shoulder 19 prevents the end of the conduit from hitting the valve centered with the bore 15. This centering, and centering of an inadvertently disturbed casing, is facilitated by the bore being 15 perpendicular to a longitudinal cavity 20 within the lower portion 12.

The bore 17 also is in communication with, i.e. continuous with, the longitudinal cavity 20 within the lower portion 12, as best seen in FIG. 4, because the fluid line concerned is perpendicular to the valve concerned, or more precisely, the actuating nut typical to a buried fluid line conventional casing enclosed valve, including but not limited to a shut off valve enclosed in a curb box, is intended to face upward in perpendicular relation to the fluid line. A guard 10 in accordance with the principles relating to the present invention keeps this actuating nut clean and correctly oriented if the casing is disturbed from the desired vertical disposition during filling of the excavated cavity.

The lower portion 12 of the guard 10 extends a distance to either side of the upwardly extending upper portion 11 mainly to prevent earth from entering through the opposed arches of the casing. For this reason the opposed ends 21 of the lower portion 12 are preferably dimensioned to extend and fit into the opposed arches of conventional curb box with the interior surface 25 of the longitudinal cavity 20 dimensioned to avoid physical contact of the guard 10 with the portion of the fluid line enclosed thereby. The entire guard 10 is preferably symmetric about perpendicular vertical planes through a centerline of the bore 17 in conformance with its intended disposition. This facilitates alignment of the casing with the upward direction of the valve and restoration of this alignment with the guard 10 and the valve if the casing is disturbed during filling of the excavated cavity.

With the ends 21 of the lower portion 12 fitted into the arches of a curb box the bottom edges adjacent the arch preferably rest upon the top surfaces 29 of stabilizers 27 extending laterally outward from the bottom 23 of the lower portion 12 of the guard 10. This aspect is not essential to fulfillment of the principles relating to the present invention but is considered to be of considerable utility in preferred embodiment of the same. For this reason, and for providing stability efficiently in general, two opposed pairs of stabilizers 27 extending laterally from each end 21 of the lower portion 12 are preferred as seen in FIGS. 3 & 4. A single stabilizer 27 on either side of the lower portion 12 of full longitudinal length would also provide this desirable feature but less efficiently.

Each end 21 of the lower portion 12 of the guard 10 must possess an end opening 22 for passage of the fluid line and the longitudinal cavity 20 must be open at the bottom 23 to permit disposition of the guard 10 over the same. The lower interior surface 25 of the lower portion 12 preferably do not make contact with the enclosed portion of the fluid line concerned. Both this lower interior surface 25 and the lower exterior surface 26 are substantially flat and vertical proximate the bottom 23 and curved above to give the lower portion 12 an inverted U shape as best seen in FIG. 2 to provide substantially uniform spacing about the portion of the cylindrical fluid line enclosed thereby.

As also best seen in FIG. 2a substantially uniform wall thickness between these two surfaces 25, 26 is used and a substantially uniform wall thickness, further seen to be maintained throughout the entire structure of the guard 10, facilitates molding by any method as well as manufacture by deposition or cutting and forming sheet metal or polymer. A substantially uniform wall thickness between the bore 17 and the upper exterior surface 16 is similarly preferred and the entire configuration as depicted in FIGS. 1–4 is considered to be the most efficient with regard to manufacture by molding specifically and by other means such as forming by according exemplar as a guard 10 formed from sheet will possess wholly uniform wall thicknesses but lack the blending of the substantially continuous upper and lower exterior surfaces 16, 26 of the upper and lower portions 11, 12.

The foregoing is intended to provide one practiced in the art with the best known manner of making and using a buried fluid line casing enclosed valve guard 10 in accordance with the principles relating to the present invention and is expressly not to be interpreted in any manner as restrictive of said invention or of the rights and privileges secured by Letters Patents for which.

We claim:

1. A valve guard, intended to protect a valve operational upon a buried fluid line enclosed by a conventional casing, said guard comprising:
    an upper portion and a lower portion each possessing an exterior surface substantially continuous with each other;
    said upper portion possessing a substantially vertical bore with an upward opening at the top in communication with, and substantially perpendicular to, a substantially horizontal longitudinal cavity within said lower portion open to the bottom and two opposed ends of said lower portion extending perpendicularly from said upper portion in two opposed directions and possessing an interior surface defining said longitudinal cavity;
    said lower portion and said longitudinal cavity being dimensioned to enclose a portion of a cylindrical fluid line with said bottom of said lower portion and said fluid line both resting on the same substantially horizontal surface;
    said longitudinal cavity and said bore being dimensioned to enclose a valve operative upon said fluid line centered with said bore and oriented upwardly in alignment with said bore perpendicular to said fluid line;
    said guard being dimensioned to fit inside a conventional casing for said valve providing operational access to said valve after burying of said fluid line with said casing surrounded by earth;
    whereby said guard, positioned about said valve upon said fluid line facilitates alignment of a casing about and above said valve upon said fluid line, prevents entrance of earth into said casing during filling of an excavated cavity for said fluid line, and facilitates restoration of casing alignment if disturbed from a desired vertical orientation with insertion of the end of a length of conduit into said bore.

2. The valve guard of claim 1 with said bore further possessing an internal shoulder.

3. The valve guard of claim 1 with said upper portion possessing a substantially cylindrical exterior surface.

4. The valve guard of claim 1 with said upper portion possessing a substantially uniform wall thickness between said bore and said exterior surface.

5. The valve guard of claim 1 with a substantially cylindrical bore.

6. The valve guard of claim 1 with a substantially circular upward opening.

7. The valve guard of claim 1 having a lower portion substantially symmetric about both vertical orthogonal planes through a centerline of said bore.

8. The valve guard of claim 1 with said lower portion possessing a substantially uniform wall thickness between said lower interior surface and said lower exterior surface.

9. The valve guard of claim 1 with said lower exterior and interior surfaces proximate said bottom of said lower portion both being substantially flat and vertical.

10. The valve guard of claim 1 with an upwardly convex lower exterior surface area and a downwardly concave lower interior surface area above said bottom of said lower portion.

11. The valve guard of claim 10 with said upwardly convex lower exterior and downwardly concave lower interior surface areas being substantially semi-cylindrical.

12. The valve guard of claim 11 with each said end of said lower portion possessing an inverted U shaped configuration.

13. The valve guard of claim 1 possessing at least one pair of stabilizers extending laterally outward from said bottom of said lower portion.

14. The valve guard of claim 13 having stabilizers of substantially uniform thickness.

15. The valve guard of claim 13 possessing one said pair of laterally opposed stabilizers extending laterally outward from each said end of said lower portion.

16. The valve guard of claim 1 constructed in one piece.

17. The valve guard of claim 16 constructed in one piece by molding.

18. The valve guard of claim 17 possessing a substantially uniform wall thickness.

19. The valve guard of claim 17 molded in one piece in resin.

20. The valve guard of claim 19 injection molded in one piece of thermoplastic polymer.

* * * * *